Patented Oct. 26, 1937

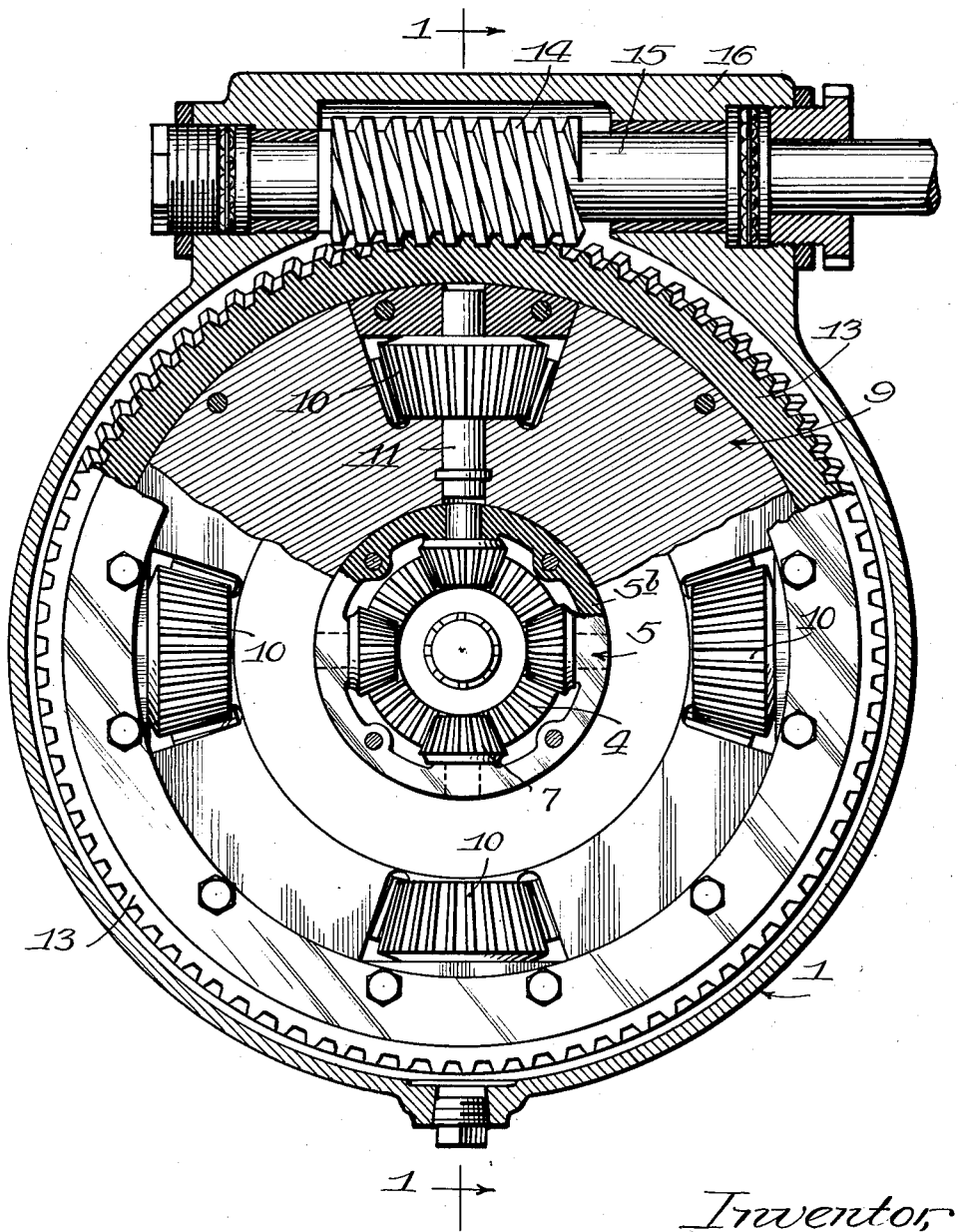

2,096,834

UNITED STATES PATENT OFFICE 2,096,834

DIFFERENTIAL DRIVE MECHANISM

Charles F. Allison, South Chicago, Ill., assignor of one-half to John J. Doherty, Dwight, Ill.

Application June 8, 1936, Serial No. 84,126

2 Claims. (Cl. 74—314)

This invention relates to improvements in differential drive mechanisms, and more particularly to a novel system of differential gearing adapted to be incorporated in the drive of a motor vehicle.

The object of the invention is to provide a differential drive which will transmit the power of the motor to the rear driving wheels through the usual arrangement of propeller shafts journalled in the rear axle, but in so doing will eliminate certain reaction forces which are detrimental to the proper balance of the vehicle while in motion.

It is a well known fact that in the standard type of differential drive mechanism as now employed in motor vehicle construction, the transmission of the power of the motor through the differential mechanism to the rear wheels, there is exerted a torque acting about the rear axle in a direction tending to lift the front end of the vehicle from the ground, this tendency becoming more pronounced as the speed of the vehicle is increased, thus making it difficult to control the direction since there is less weight tending to hold the front wheels to the road and to respond to the steering mechanism.

The differential mechanism about to be set forth is calculated to eliminate the undesirable torque forces and to create what may be termed a balanced drive.

Referring to the accompanying drawings,

Figure 2 is a view in vertical section through the differential housing as taken on line 2—2 of Figure 1.

Figure 1:
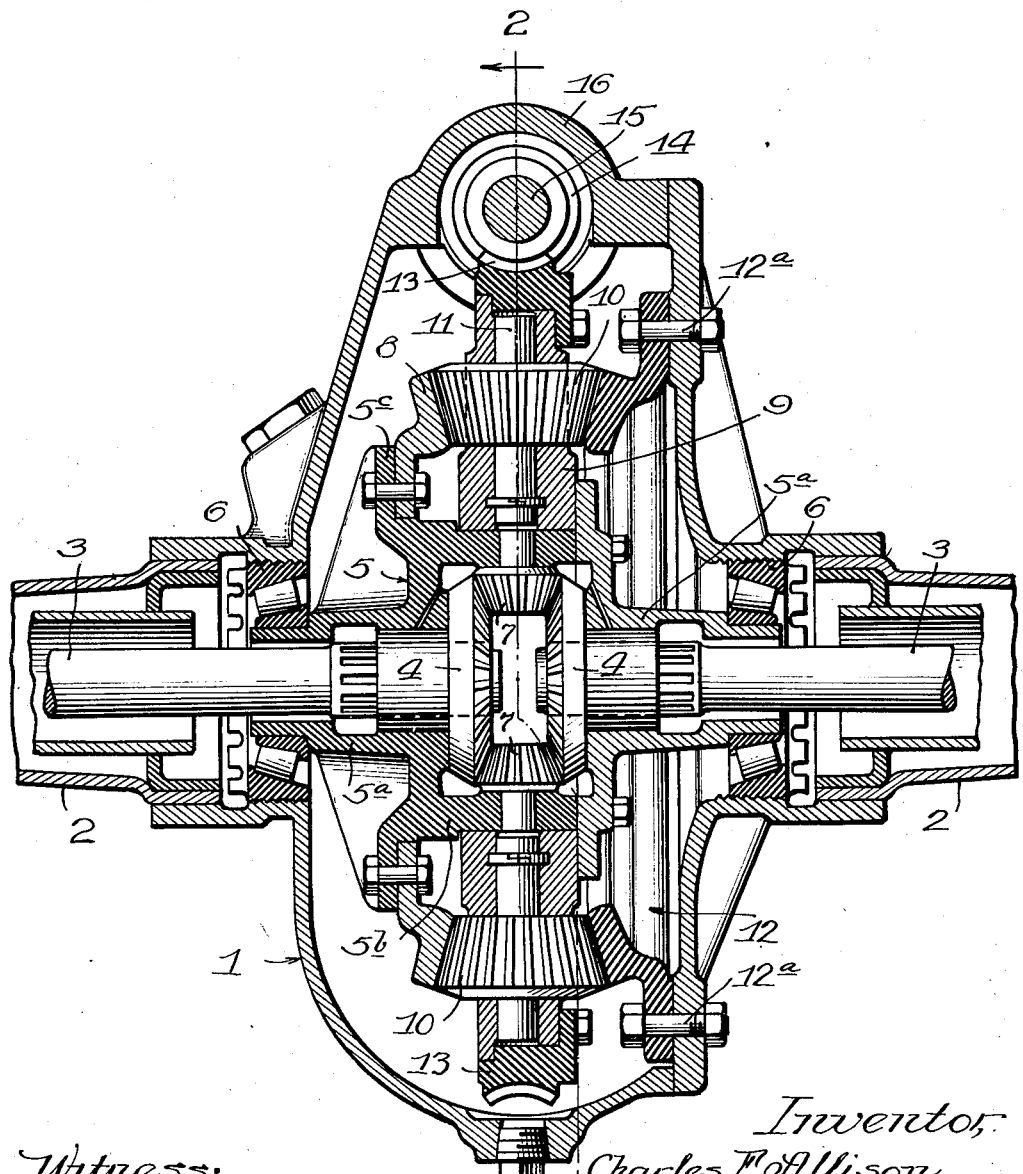
Figure 1 is a view in vertical cross section through the differential mechanism, as taken on line 1—1 of Figure 2.

The drive herein disclosed follows up to a certain point the standard differential drive mechanism and comprises in general a differential housing 1 located centrally of the rear axle assembly including the rear axle housings 2, 2 extending laterally from either side of the differential housing 1. Extending axially of the rear axle housings 2, 2 are the axle propeller or driven shafts 3, 3 connected at their outer ends with the rear driving wheels in the usual manner, and having rigidly mounted at their inner ends beveled gears 4, 4 facing each other at the center of the differential housing. Surrounding the inner ends of the propeller shafts 3, 3 is a spider 5 having tubular extensions 5ᵃ, 5ᵃ mounted in bearings 6, 6 located at the inner ends of the rear axle housings 2, 2, and in turn forming bearings for the inner ends of the propeller shafts 3, 3.

Integral with the spider 5 is an annular ring-like bearing 5ᵇ surrounding the beveled gears 4, 4 and supporting a pair of beveled pinions 7, 7 disposed diametrically opposite each other and meshing with the beveled gears 4, 4. Also carried by the spider 5 is a large ring gear 8 bolted to a radial flange 5ᶜ of said spider 5 and offset to one side of the central longitudinal plane of the differential housing.

Now the annular bearing 5ᵇ of the spider 5 forms the radial bearing for a still larger and auxiliary spider 9 consisting of a ring supporting at angular positions 90° apart, a group of four beveled pinions 10 mounted on axles 11 extending radially of the auxiliary spider 9 and journalled in suitable bearings provided therein. This group of four beveled gears 10 are positioned to mesh with the ring gear 8 carried by the inner or primary spider 5, and immediately opposite said ring gear 8 is another ring gear 12 also meshing with the group of four beveled gears 10, but this ring gear 12 is stationary, being bolted to one side of the differential housing by means of bolts 12ᵃ.

Referring further to the outer or auxiliary spider 9, the same also carries about its periphery a large ring gear 13 which meshes with a worm 14 carried by a drive shaft 15 supported in a suitable bearing member 16 integral with the differential housing. The drive shaft 15 extends forwardly in a generally horizontal direction and through the usual arrangement of universal joints is connected through the transmission to the crank shaft of the motor. For the purpose of this disclosure, a worm type of drive is shown, although any other type of drive would be equally effective, as for example through spur, spiral or beveled gearing.

In describing the action and the application of forces in transmitting power through this mechanism, attention might first be called to the fact that if the power from the drive shaft 15 were delivered directly to the ring gear 8, as for instance through one of the beveled gears 10, the mechanism would then correspond very closely to the standard differential drive mechanism, but as has already been pointed out, two intermediate elements have been added, namely, the secondary spider 9 carrying the beveled gears 10 and the fixed or stationary ring gear 12.

Now considering the forces acting in transmitting power through the standard differential drive, it is obvious that as the propeller shafts 3 rotate in a direction to drive the car forwardly, the spider 5 and the pinions 7, 7 carried thereby will rotate in the same direction. Now, if power is delivered directly to the spider 5 by a driving gear member meshing with the ring gear 8 and the load on the rear wheels is increased, a condition is approached wherein the wheels tend to be brought to a standstill and the power otherwise delivered from the motor to the differential mechanism for driving the rear wheels is delivered or absorbed by the supporting structure as a torque. Thus it will appear that as the load on the wheels increases, tending to oppose their rotation, a stalling torque is applied to the wheels and there will be a tendency for the ring gear 8 to remain stationary and the power transmitting or driving gear members 10 to ride or climb upwardly on the face of this ring gear. However, these gear members or pinions 10 mesh with the stationary ring gear 12 fixed to the differential housing and therefore this climbing tendency can only be exerted as a torque acting about the rear axle of the vehicle and in an upward direction, that is to say, in a direction to lift the front end of the vehicle from the road surface. And actually this is what takes place in the standard motor vehicle, the effect being particularly noticeable in the lighter makes, inasmuch as there is not the same amount of weight to oppose and counteract the torque action as in the heavier vehicles and therefore greater difficulty in steering and less control are experienced.

Now, referring to the improved differential drive, if a secondary spider and beveled pinions are interposed between those parts that constitute the primary or standard differential drive mechanism and the driving shaft, and furthermore, a fixed ring gear is mounted on the differential housing to mesh with the beveled gears of the secondary spider, all undesired torque actions will then be eliminated, inasmuch as the tendency for the power transmitting pinions to climb the ring gear is fully counteracted by the fixed ring gear 12. In other words, as the load in the form of a stalling torque is applied to the rear wheels, (and this is what happens as the speed of a vehicle increases), the tendency of the beveled gears 10 to climb the ring gear 8 is opposed by an equal force tending to restrain said beveled gears from climbing, this restraining force being exerted by the stationary ring gear 12 on said beveled gears. Consequently the reaction forces accompanying the transmission of power through the differential mechanism to the driving wheels are balanced and placed in equilibrium so that there is no torque transmitted to the frame of the vehicle to oppose the even distribution of the weight on all four wheels, and thus affect its riding qualities or ability to hold the road, regardless of the speed at which it is driven.

Having set forth a preferred embodiment of my invention,

I claim:

1. In a differential drive mechanism, the combination with a differential housing and rear axle assembly including a pair of driven shafts and a drive shaft, of primary and secondary systems of differential gearing mounted in said housing, said primary system including a spider having a ring gear and said secondary system comprising a spider journalled on the spider of said primary system and carrying radially disposed beveled pinions meshing with said ring gear, and a fixed ring gear mounted on said housing and also meshing with the beveled pinions on said secondary spider, the latter having driving connection with said driving shaft.

2. In a differential drive mechanism, the combination with a differential housing and rear axle assembly including a pair of driven shafts and a drive shaft, of primary and secondary systems of differential gearing mounted in said housing, said primary system including a spider having a ring gear with beveled teeth, a ring gear corresponding to said first mentioned ring gear fixed to said housing, a secondary spider mounted to rotate on said first mentioned spider and carrying a group of radially disposed beveled pinions meshing with said ring gears, said secondary spider having peripheral gear teeth meshing with a toothed driving member on said driving shaft.

CHARLES F. ALLISON.